United States Patent [19]

Jager et al.

[11] Patent Number: 5,569,747
[45] Date of Patent: Oct. 29, 1996

[54] REACTIVE DISAZO DYESTUFFS WHICH CONTAIN TWO HETEROCYCLIC REACTIVE GROUPS

[75] Inventors: Horst Jäger, Leverkusen; Joachim Wolff, Odenthal, both of Germany

[73] Assignee: Bayer Aktiengesellschaft, Leverkusen, Germany

[21] Appl. No.: 296,309

[22] Filed: Aug. 25, 1994

[30] Foreign Application Priority Data

Sep. 1, 1993 [DE] Germany .......................... 43 29 420.0

[51] Int. Cl.[6] .......................... C09B 62/03; C09B 62/25; D06P 1/382
[52] U.S. Cl. .......................... 534/630; 534/634
[58] Field of Search .......................... 534/630, 634

[56] References Cited

U.S. PATENT DOCUMENTS

| | | | |
|---|---|---|---|
| 4,843,150 | 6/1989 | Hihara et al. | 534/634 |
| 4,988,802 | 2/1990 | Loaffler et al. | 534/634 |
| 5,200,511 | 4/1993 | Loaffler et al. | 534/634 |
| 5,223,607 | 6/1993 | Loaffler et al. | 534/634 |

FOREIGN PATENT DOCUMENTS 1508461 4/1978 United Kingdom.

OTHER PUBLICATIONS

Derwent Abstract of JP-A 60/069163, Apr. 19, 1985.

*Primary Examiner*—Fiona T. Powers
*Attorney, Agent, or Firm*—Sprung Horn Kramer & Woods

[57] ABSTRACT

Azo class reactive dyestuffs have been found which have the general formula (1)

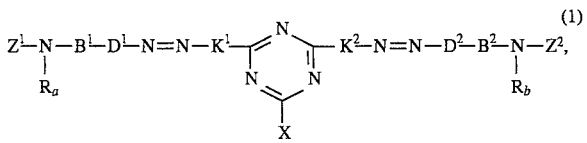

and in which $Z^1$ and $Z^2$ represent a reactive group from the pyrimidine series, X represents $SR^1$, $OR^2$ or $NR^3R^4$, and the remaining substituents have the meanings given in the description, which dyestuffs are particularly suitable for dyeing hydroxyl- and amido-containing fibres, in particular cotton.

11 Claims, No Drawings

REACTIVE DISAZO DYESTUFFS WHICH CONTAIN TWO HETEROCYCLIC REACTIVE GROUPS

The invention relates to novel azo class reactive dyestuffs, a process for their preparation and their use for dyeing hydroxyl- and amido-containing fibre materials.

JP-A 60/069163, U.S. Pat. Nos. 4,988,802, 5,223,607 and 5,200,511 already disclose bisazo dyestuffs which however have certain disadvantages associated with them.

The invention provides azo class reactive dyestuffs having the general formula (1)

$$Z^1-N-B^1-D^1-N=N-K^1-\underset{X}{\underset{N}{\overset{N}{\triangle}}}-K^2-N=N-D^2-B^2-N-Z^2, \quad (1)$$
$$\underset{R_a}{|} \qquad \qquad \underset{R_b}{|}$$

in which
- $K^1$ and $K^2$ denote coupling components which are identical or different,
- $D^1$ and $D^2$, independently of one another, represent a substituted or unsubstituted benzene or naphthalene radical, examples of possible substituents being $C_1$–$C_4$-alkoxy, Cl, $SO_3H$, COOH or $NO_2$,
- $R_a$ and $R_b$, independently of one another, denote substituted or unsubstituted $C_1$–$C_4$-alkyl,
- $B^1$ and $B^2$, independently of one another, represent a direct bond or a bridging member,
- $Z^1$ and $Z^2$, independently of one another, represent a pyrimidine reactive group containing chlorine or fluorine as the leaving group, or represent 2,3-dichloroquinoxaline- 6-carboxyl, X represents $SR^1$, $OR^2$ or $$N\begin{matrix}\diagup R^3 \\ \diagdown R^4\end{matrix}$$

in which,
- $R^1$ denotes substituted or unsubstituted $C_1$–$C_4$-alkyl, substituted or unsubstituted phenyl, naphthyl or 2-benzothiazolyl,
- $R^2$ represents hydrogen, substituted or unsubstituted $C_1$–$C_4$-alkyl or substituted or unsubstituted phenyl or naphthyl,
- $R^3$ represents hydrogen or a substituted or unsubstituted aliphatic, cycloaliphatic, heterocyclic or araliphatic radical, and
- $R^4$ represents hydrogen or a substituted or unsubstituted aliphatic, cycloaliphatic, heterocyclic, araliphatic or aromatic radical, or in which $R^3$ and $R^4$, if desired with the inclusion of a further hetero atom, can form a 5- or 6-membered ring.

Preferred coupling components $K^1$ and $K^2$ are, independently of one another, those denoting acetoacetarylides, pyrazolones, pyridones or aminonaphthols, in particular those of the formulae (2) to (5)

$$-NH-\underset{A}{\bigcirc}-NH-\overset{O}{\underset{\|}{C}}-\underset{*}{\overset{|}{C}}=\overset{OH}{\underset{|}{C}}-CH_3 \quad (2)$$

$$\underset{HO}{*}\underset{N}{\overset{(COOH\ or\ CH_3)}{\diagup}}\overset{N}{\diagdown}\ (3)$$
(with A ring bearing NH—)

$$\text{(4)}$$
structure with $CH_3$, (H, $CONH_2$, $SO_3H$ or $CH_2SO_3H$), HO, O, $(CH_2)_n$, $N-R^5$ or $$\text{(5)}$$
naphthalene with OH, $*$, $N-$, $R^5$, $(SO_3H)_m$ in which the benzene radical A can be substituted by further substituents, preferably from the series consisting of carboxyl, sulpho, chlorine or $C_1$–$C_4$-alkoxy,
n represents an integer from 2 to 6,
m is 1 or 2, and
$R^5$ represents hydrogen, methyl or ethyl,
the bivalent radicals of the formulae (2) to (5) being linked to the triazinyl radical via their amino group and to the azo group of the formula (1) via the bond marked with *.

The hydroxyl group of the formula (5) is preferably in the ortho position relative to the azo group linked via the bond marked with *.

In a further preferred embodiment, $B^1$ and $B^2$, independently of one another, denote a direct bond or a $C_1$–$C_4$-alkylene bridge, in particular —$CH_2$—, —$CH_2$—$CH_2$—, or an arylene bridge, in particular 1,3- and 1,4-phenylene, or an arylsulphylamino bridge, in particular one of the formula $$-NH-SO_2-\bigcirc-*$$

an arylcarbonylamino bridge, in particular one of the formula $$-NH-\overset{O}{\underset{\|}{C}}-\bigcirc-*$$

an alkylenecarbonylamino bridge, in particular one of the formula $$-NH-\overset{O}{\underset{\|}{C}}-CH_2-*,$$

the bond marked with * indicating the linkage

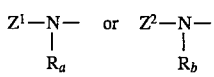

Preferred reactive groups $Z^1$ and $Z^2$, independently of one another, have the formula (6)

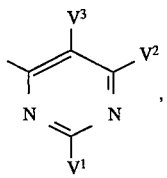 (6)

in which $V^3$ represents H, $CH_3$, F, Cl, Br, $NO_2$, CN, $CONH_2$, $SO_2NH_2$, $CH_3SO_2$, COOH, $COOCH_3$ or $COOC_2H_5$, $V^2$ and $V^1$, independently of one another, represent H, $CH_3$, F, Cl or $CH_3SO_2$, with the proviso that at least one of the radicals $V^1$ or $V^2$ denotes F or Cl.

Examples of possible substituents of the $C_1$-$C_4$-alkyl radicals as $R^1$ and $R^2$ are: OH, COOH, $SO_3H$, $OSO_3H$.

Examples of possible substituents of the phenyl, naphthyl or 2-benzothiazolyl radicals as $R^1$ and $R^2$ are: $CH_3$, $CH_3O$, Cl, COOH, $SO_3H$ or $NO_2$.

The aliphatic radicals as $R^3$ and $R^4$ are preferably alkyl radicals, in particular those having 1 to 6 C atoms, which may be interrupted by hetero atoms and are substituted or unsubstituted, examples of interrupting hetero atoms being O, S, $SO_2$, $NR^5$ ($R^5$ being hydrogen, $C_1$-$C_4$-alkyl), $NR^5CO$ or $NR^5SO_2$ and examples of possible substituents being OH, Cl, F, COOH, $SO_3H$, $OSO_3H$, $SO_2CH=CH_2$, CN, $SO_2CH2CH2Cl$ or $SO_2CH_2CH_2OSO_3H$.

The cycloaliphatic radicals as $R^3$ and $R^4$ are preferably 5- or 6-membered cycloalkyl radicals.

The heterocyclic radicals as $R^3$ and $R^4$ are preferably 5- or 6-membered cycloalkyl rings which are interrupted by hetero atoms, in particular $SO_2$, O or N.

Examples of araliphatic radicals as $R^3$ and $R^4$ are those of the formula

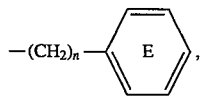

where n is an integer from 1 to 4 and the radical E can be substituted by, for example, Cl, $NO_2$, COOH, $SO_3H$, $CH_3$, $OCH_3$, $SO_2CH_2CH_2OSO_3H$, $SO_2CH=CH_2$ or $CH_2SO_2CH_2CH_2OSO_3H$.

Aromatic radicals as $R^4$ are preferably phenyl or naphthyl radicals which are unsubstituted or substituted by, for example, $OCH_3$, $OC_2H_5$, $OCH_2CH_2OH$, $CH_3$, $C_2H_5$, $-CH(CH_3)_2$, F, Cl, Br, COOH, $SO_3H$, $NO_2$, $SO_2CH_2CH_2OSO_3H$, $SO_2CH=CH_2$, $CH_2SO_2CH_2CH_2OSO_3H$ or $CH_2SO_2CH=CH_2$.

Hetero atoms for the ring formation of $R^3$ and $R^4$ are preferably O, NH, $NCH_3$, $NCOCH_3$, $N-C_2H_4SO_2CH=CH_2$, S, SO or $SO_2$.

Specific examples of particularly preferred embodiments for the general designations $-K^1-$, $-K^2-$

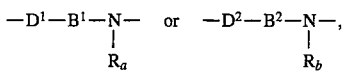

the $-X$ and $-Z^1$ and $-Z^2$ listed in the formula (1) are given below.

Coupling components $-K^1-$ and $-K^1-$, independently of one another, denote, for example:

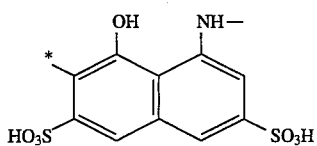

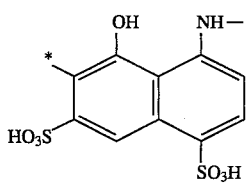

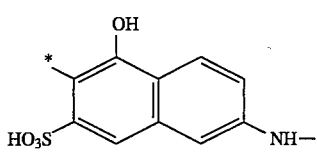

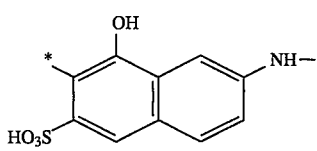

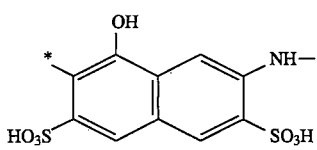

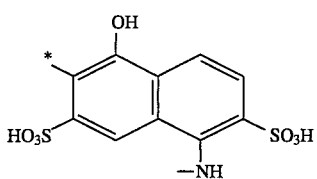

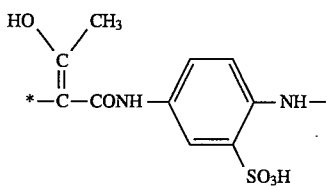

-continued
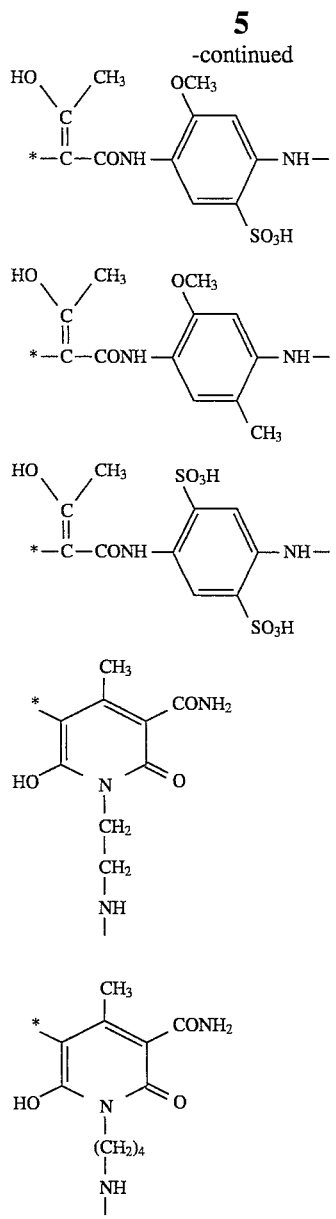
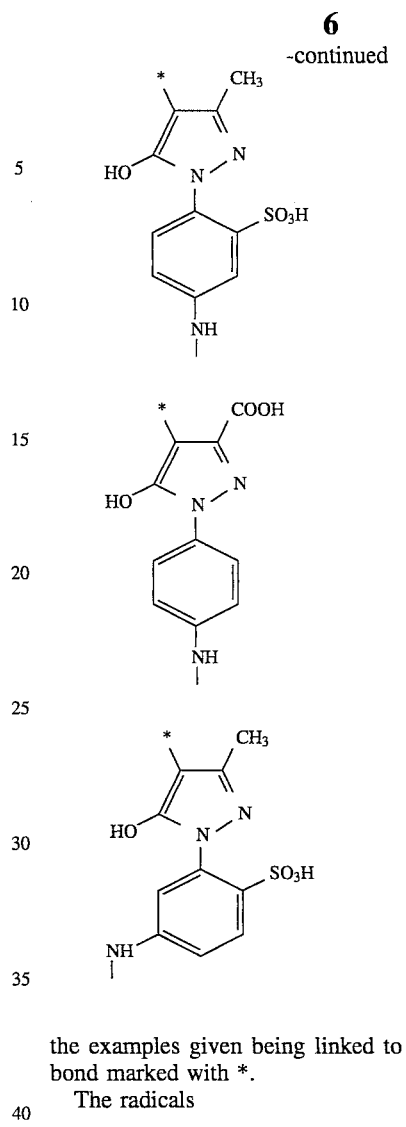
the examples given being linked to the azo group via the bond marked with *.
The radicals
$$-\underset{R_a}{\underset{|}{N}}-B^1-D^1- \quad \text{and} \quad -\underset{R_b}{\underset{|}{N}}-B^2-D^2-,$$
independently of one another, denote, for example,
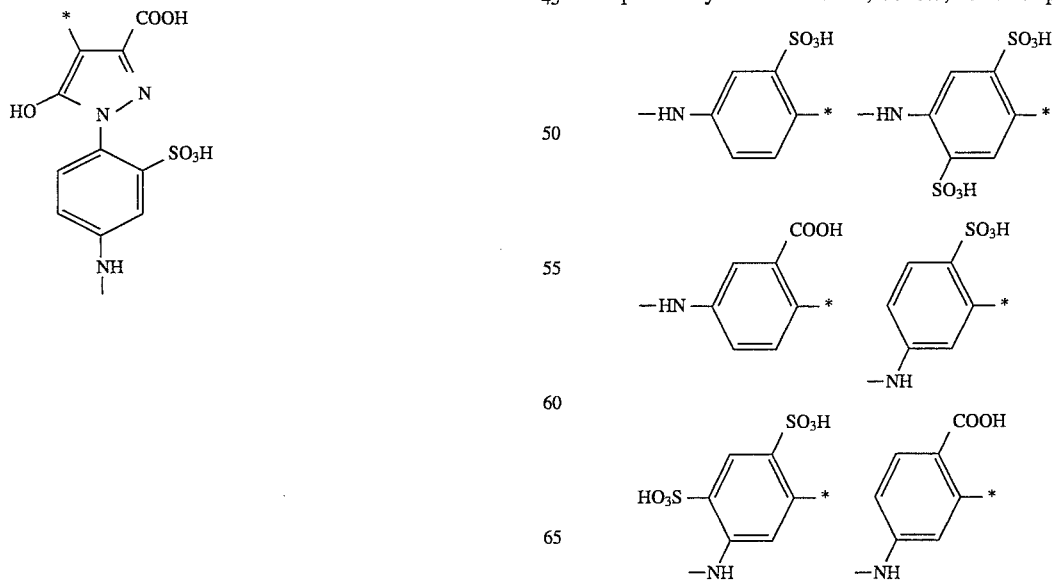

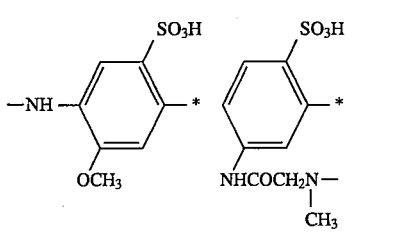
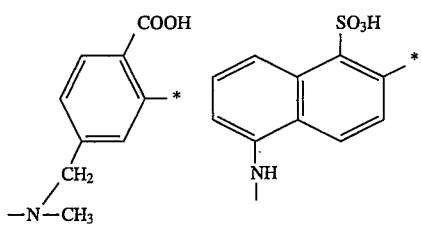
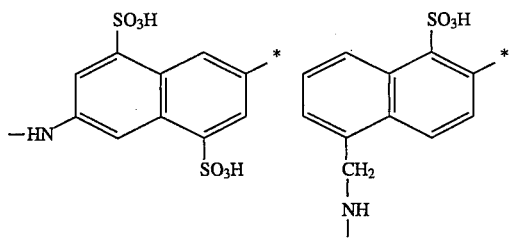
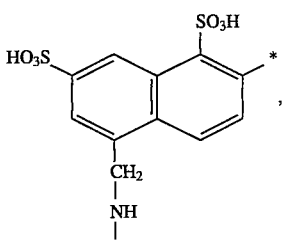

the examples given being linked to the azo group via the bonds marked with *.

The radical —X on the triazine having the meaning —SR$^1$ denotes, in particular,

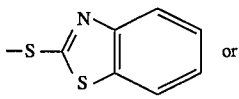
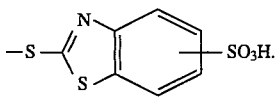

The radical —X on the triazine having the meaning —OR$^2$ denotes, in particular, —OH, —OCH$_3$, —OC$_2$H$_5$, —OCH(CH$_3$)$_2$, —OCH$_2$CH$_2$OCH$_3$,

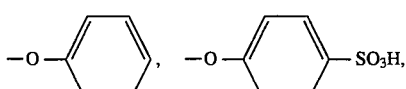

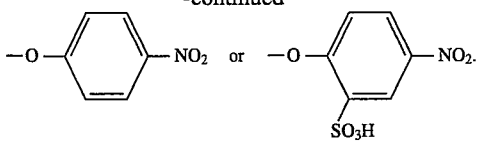

The radical —X on the triazine having the meaning

denotes, in particular,

—NH$_2$, —NHCH$_3$, —N(CH$_3$)$_2$, —NHC$_2$H$_5$,

—N(C$_2$H$_5$)$_2$, —NHCH$_2$CH$_2$OH, —NHCH$_2$CH$_2$OSO$_3$H,

—NHCH$_2$CH$_2$SO$_3$H, —NHCH$_2$COOH,

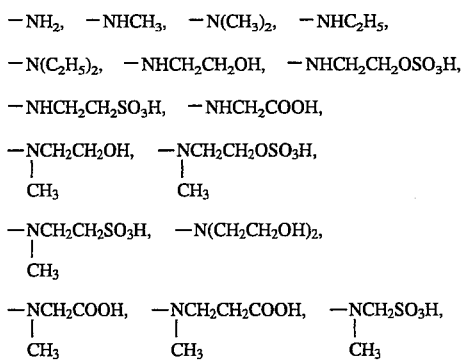

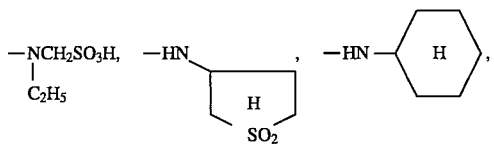

—NHCH$_2$CH$_2$CH$_2$SO$_2$CH$_2$CH$_2$OSO$_3$H,

—NHCH$_2$CH$_2$SO$_2$CH$_2$CH$_2$OSO$_3$H,

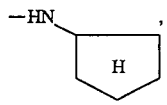
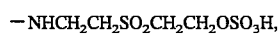
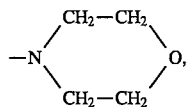
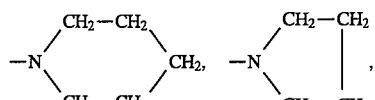
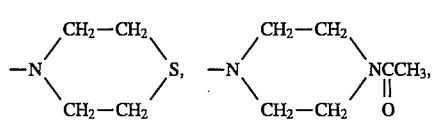
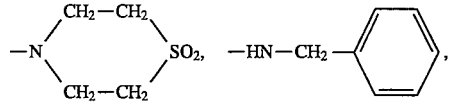
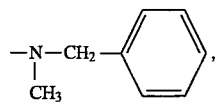

-continued

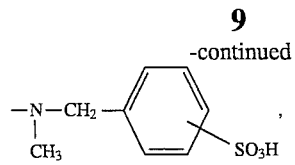

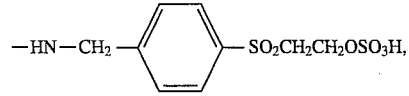

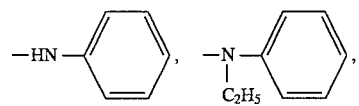

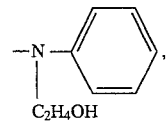

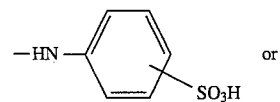

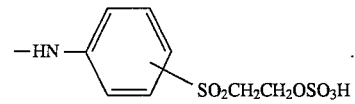

The reactive groups $Z^1$ and $Z^2$, independently of one another, denote, for example: mono-, di-, or trihalogenopyrimidinyl radicals, such as the 2,4-dichloro-6-pyrimidinyl, 2,4,5-trichloro-6-pyrimidinyl, 2,4-dichloro- 5-nitro- or -5-methyl- or -5-carboxymethyl- or -5-carboxy- or -5-cyano-6-pyrimidinyl radical, and the corresponding fluorine derivatives of the abovementioned chlorine-substituted heterocyclic radicals, of these, for example, the 2-fluoro-4-pyrimidinyl, 2,6-difluoro- 4-pyrimidinyl, 2,6-difluoro-5-chloro-4-pyrimidinyl, 2-fluoro-5,6-dichloro-4-pyrimidinyl, 2,6-difluoro- 5-methyl-4-pyrimidinyl, 2-fluoro-5-methyl-6-chloro- 4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 2,6-difluoro-5-bromo- 4-pyrimidinyl, 2-fluoro-5-bromo-6-methyl-4-pyrimidinyl, 2-fluoro-5-nitro-4-pyrimidinyl, 2,6-difluoro-5-nitro- 4-pyrimidinyl, 2-fluoro-6-methyl-4-pyrimidinyl, 2-fluoro- 5-chloro-6-methyl-4-pyrimidinyl, 2-fluoro-5-chloro-4-pyrimidinyl, 2-fluoro-6-chloro- 4-pyrimidinyl, 2-fluoro-5-methylsulphonyl-4-pyrimidinyl, 2-fluoro-5-carboxamido-4-pyrimidinyl, 2-fluoro-5-carbomethoxy- 4-pyrimidinyl, 2-fluoro-5-chloro-pyrimidin-4-yl; 2-methyl-4-fluoro-5-methylsulphonyl-6-pyrimidinyl; 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 6-fluoro-5-chloro-4-pyrimidinyl, 2-methyl-6-fluoro-5-chloro-4-pyrimidinyl, 2,3-dichloroquinoxaline-6-carbonyl radical.

Particular preference is given to dyestuffs of the formula (1) in which $K^1$ and $K^2$, independently of one another, represent

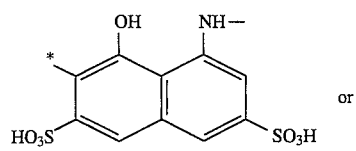

or

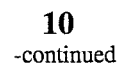

$K^1$ and $K^2$ being linked to the azo group via the bond marked with *, and/or

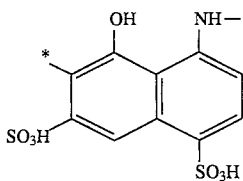

is identical to

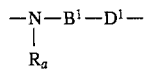

and represents

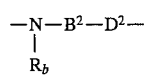

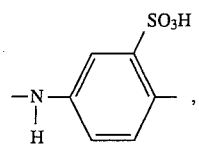
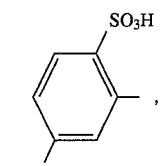

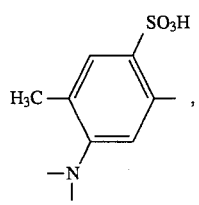
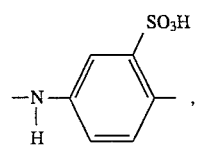

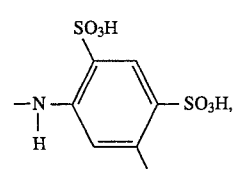
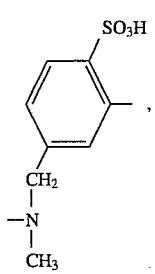

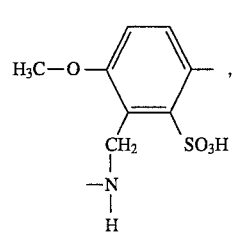
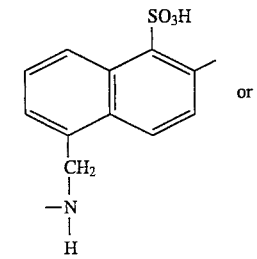 or

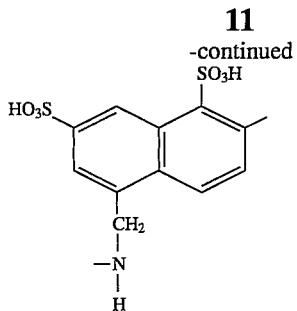

Very particular preference is given to dyestuffs of the formula (1) in which

K¹ and K² each represent

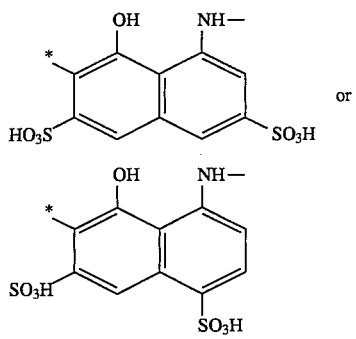

K¹ and K² being linked to the azo group via the bond marked with *, and

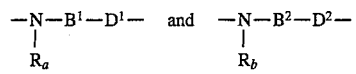

each denote

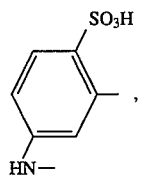

and

Z¹ and Z², independently of one another, represent

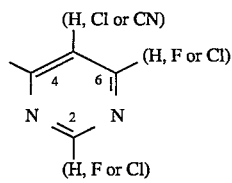

with the proviso that at least one of the substituents in the 2- or 6- position represents F or Cl, Z¹ and Z² being preferably identical and representing in particular

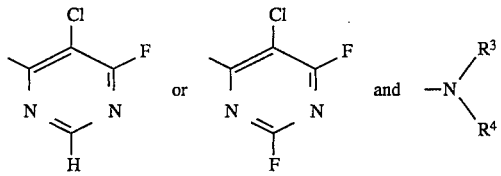

represents $NH_2$ or denotes the radical of an aliphatic amino group, preferably of an aliphatic amino group in which $R^3$ denotes H, $CH_3$ or $C_2H_5$ and $R^4$ denotes a $C_1$–$C_4$-alkyl group substituted by COOH, $SO_3H$ or $OSO_3H$, and represents in particular

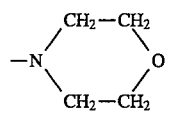

In a further preferred embodiment,

K¹ is K²

D¹ is D²

B¹ is B²

Z¹ is Z², and $R_a$ is $R_b$.

The invention also provides a process for preparing dyestuffs of the formula (1), characterized in that a) two mol equivalents of an amine or one mol equivalent each of two different amines having the general formula (7a) and/or (7b)

in which $Z^1$, $R_a$, $B^1$ and $D^1$ and $Z^2$, $R_b$, $B^2$ and $D^2$ have the meaning given, are diazotized, and the resulting diazonium salt is reacted with one mol equivalent of a coupling component of the formula (8)

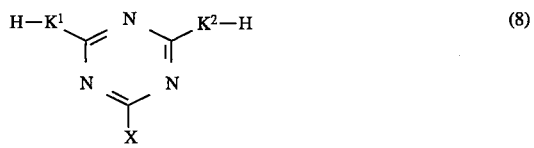

in which K¹, K² and X have the meaning given, or b) one mol equivalent of an azo dyestuff of the formula

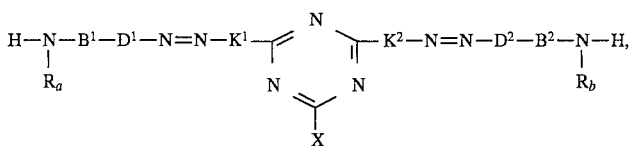 (9)

in which $R_a$, $R_b$, $B^1$, $B^2$, $D^2$, $D^2$, $K^1$, X and $K^2$ have the meaning given,
is condensed with two mol equivalents of a reactive component of the formula $Z^1$—F or —Cl or $Z^2$—F or —Cl  (10)

or with one mol equivalent each of a different reactive component $Z^1$—F or —Cl and $Z^2$—F or —Cl, in which $Z^1$ and $Z^2$ have the meaning given, with the elimination of HF and/or HCl.

The amines of the formulae (7a) and (7b) are obtained by acylating amines of the formulae (11a) and (11b), respectively

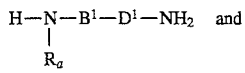 (11a)

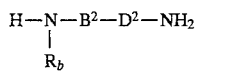 (11b)

with the reactive components of the formula (10).

The amines of the formulae (11a) and (11b) are known. Examples thereof are the radicals

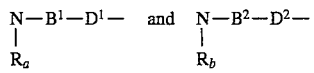

supplemented by an H atom and an $NH_2$ group, which are listed above.

Examples of reactive components (10) are the fluorine compounds and chlorine compounds of the reactive groups $Z^1$ and $Z^2$ listed above.

The preparation of the coupling components of the formula (8) is described in U.S. Pat. No. 5,223,607, DE-A 2,748,929 and DE-A 2,748,966.

The reaction conditions of the preparation are those customary in the area of acylation, diazotization and coupling. Thus, the dyestuffs and dyestuff intermediates according to the invention are preferably prepared in an aqueous medium. Condensation with the reactive components (10) is carried out at 0° to 90° C. depending on the reactivity of the reactive components, the hydrochloric acid or hydrofluoric acid released during condensation being neutralized by addition of basic substances.

These substances can be added either in solid or dissolved form. Examples include LiOH, $Li_2CO_3$, NaOH, $Na_2CO_3$, $NaHCO_3$, KOH, $K_2CO_3$, MgO, $MgCO_3$, $Ca(OH)_2$, $CaCO_3$.

The reactive dyestuffs of the formula (1) can be isolated and processed to give useful, dry dyeing preparations. Isolation is preferably carried out at the lowest possible temperatures by salting out and filtration. The filtered dyestuffs can be dried, if appropriate after addition of a buffer mixture, for example monosodium phosphate and disodium phosphate; drying is preferably carried out at moderately high temperatures and under reduced pressure. In some cases, the dry preparations according to the invention can be prepared directly, i.e. without intermediate isolation of the dyestuffs, by spray-drying of the entire preparation mixture.

The reactive dyestuffs of the formula (1) dye hydroxyland amido-containing fibre material, in particular cotton, in brilliant shades. The dyestuffs have very good affinity for the fibre material and produce high fixation yields. The fastness level of the dyeings is very high. The dyeings are dischargeable.

The formulae given are those of the free acids.

In general, the synthesis results in the formation of salts, which are also provided by the present invention, in general the alkali metal salts, in particular sodium salts, potassium salts or lithium salts, and the dyestuffs are also used in this form for dyeing.

EXAMPLE 1

A neutral solution of 0.5 mol of 1-amino-8-hydroxynaphthalene- 3,6-disulphonic acid (H acid) in 400 ml of water is run into a well-stirred initial charge of 95 g of cyanuric chloride and 50 ml of water at 10° over a period of about 1 hour. Stirring is continued for about 3 hours, as a result of which the H acid goes into solution, indicating that acylation is complete. A neutral solution of 0.47 mol of H acid is added to this solution, the pH is brought to 4.5 by sprinkling in sodium bicarbonate, and the resulting solution is heated to 30°. It is then stirred at 30° and pH 4.5 for 4 hours while maintaining the pH constant by addition of sodium bicarbonate. The biscondensation product precipitates in part, and the batch needs to be diluted with about 1 l of water. When excess B acid can no longer be detected, the reaction mixture is brought to a pH of 7, 450 g of an aqueous solution containing 1.1 mol of methyltaurine as the sodium salt are added, and the mixture is heated at 80° for 5 hours. The exchange of the third chlorine atom is then complete. For isolation, the pH is brought down to 6.0 to 6.5, and the solution is saturated with potassium chloride. After cooling to room temperature, the product is filtered off with suction to give a paste which can be further used in this form. The content is determined by C, H, N, S analysis of a dried sample.

The compound has the formula

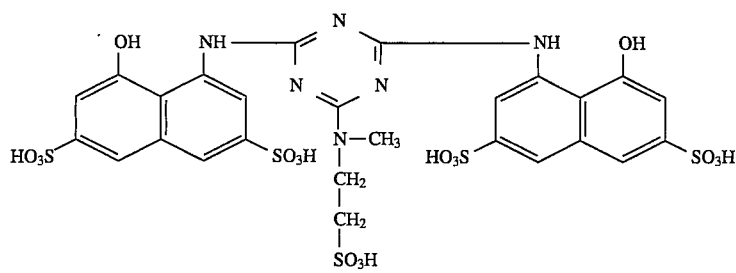

EXAMPLE 2

The procedure of Example 1 is repeated, preparing the biscondensation product from 1 mol of cyanuric chloride and 2 mol of H acid.

95 g of morpholine are added instead of 1.1 mol of methyltaurine solution, and the batch is heated at 80° C. until exchange of the third chlorine atom has taken place, which requires about 4 hours. For isolation, the pH is brought to 6, and 20% by volume of potassium chloride is added to the clear solution. The precipitated condensation product is filtered off with suction at room temperature and dried. The content is determined by C, H, N, S analysis. The $^1$H NMR spectrum is in agreement with the following structure:

and the mixture is stirred at 10° and pH 5.0 to 5.5 until the amino group has been acylated. This is followed by adding a neutral solution of 0.47 mol of 1-amino-4-N-acetoacetylamino-5-methoxy-benzene- 2-sulphonic acid and increasing the temperature to 40° and carrying out the condensation reaction at pH 5.0 to 5.5 until acylation is complete.

The reaction mixture of the monochloro condensation product is then brought to a pH of 7, and 450 g of an aqueous solution containing 1.1 mol of N-methyltaurine as the sodium salt are added. The mixture is then heated at 80° to 85° until exchange of the third chlorine atom is complete. The reaction product is salted out and isolated at pH 5 and room temperature.

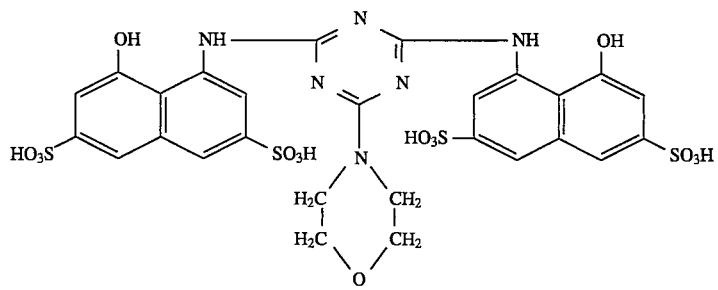

EXAMPLE 3

The procedure of the preceding example is repeated, except that 1-amino-8-hydroxynaphthalene-3,6-disulphonic acid is replaced by the same amount of 1-amino-8-hydroxynaphthalene- 3,5-disulphonic acid, to give the dicouplable coupling component listed below The paste can be used in this form for the subsequent coupling reaction.

The coupling component has the formula

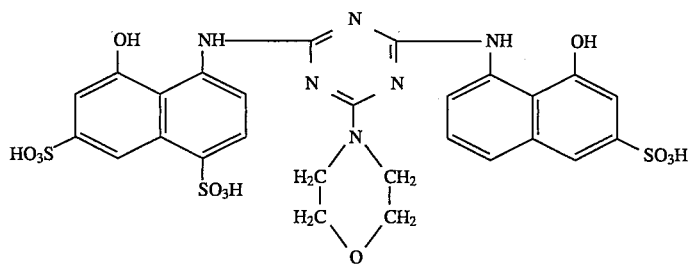

EXAMPLE 4

A neutral solution of 0.5 mol of 1-amino-4-N-acetoacetylamino-5-methoxy-benzene-2-sulphonic acid is added at 10° to a suspension of 97 g of cyanuric chloride in 2.5 l of water,

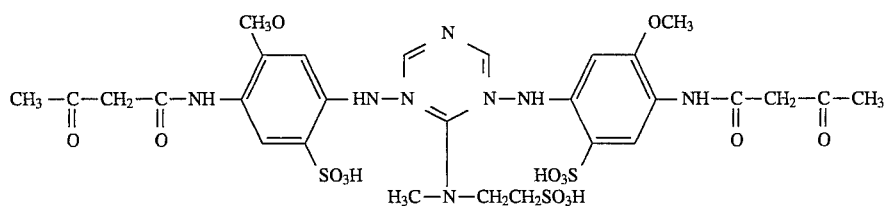

EXAMPLE 5

The monochloro condensation product is prepared by the procedure of Example 4, 0.5 mol of m-sulphanilic acid is then added instead of N-methyltaurine, and the mixture is heated at 100° and pH 6.5 for several hours until exchange of the third chlorine atom is complete to give, after isolation by salting out, a dicouplable coupling component of the following structure table below for the condensation with cyanuric chloride, the coupling components mentioned in column 3 of the table below for the condensation with the dichloro condensation product, and the amines listed in column 4 for the exchange of the third chlorine atom.

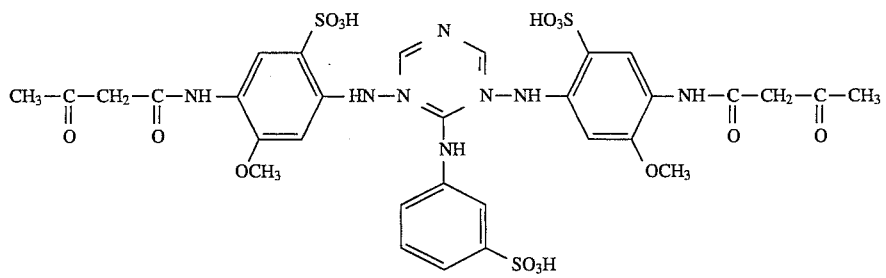

EXAMPLE 6

A neutral solution of 149 g of 1-(4-amino-2-sulphophenyl)-pyrazol- 5-one-3-carboxylic acid in 750 ml of water is added to a suspension of 97 g of cyanuric chloride in 2.5 l of water at 10° C., and the condensation reaction is carried out at 10° C. and pH 5.0 to 5.5 until acylation is complete. A neutral solution of 145 g of 1-(4-amino-2-sulphophenyl)-pyrazol-5-one-3-carboxylic acid is then added to this reaction mixture. The resulting mixture is heated at 35° to 40° C. while maintaining the pH in the range from 5.0 to 5.5 by sprinkling in sodium bicarbonate. When condensation is complete, the pH is brought to 7, and 95 g of morpholine are added. The mixture is heated at 85° C. for about 4 hours. After exchange of the third chlorine atom, the pH is brought to 4 to 5, and the reaction product is salted out and filtered off with suction at room temperature. It can be further used in the form of the moist paste. The compound has the formula

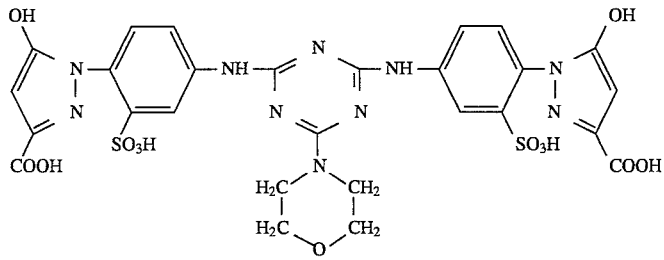

Further valuable dicouplable coupling components are obtained by repeating the procedures of Examples 1 to 6 and using the coupling components listed in column 2 of the

| Example | Coupling component | Coupling component | Amine |
|---|---|---|---|
| 7 | 1-amino-8-hydroxy-naphthalene-3,6-disulphonic acid | 1-amino-8-hydroxy-naphthalene-4,6-disulphonic acid | taurine |
| 8 | 1-amino-8-hydroxy-naphthalene-3,6-disulphonic acid | 1-amino-8-hydroxy-naphthalene-4,6-disulphonic acid | N-methyltaurine |
| 9 | 1-amino-8-hydroxy-naphthalene-3,6-disulphonic acid | 1-amino-8-hydroxy-naphthalene-4,6-disulphonic acid | morpholine |
| 10 | 1-amino-8-hydroxy-naphthalene-3,6-disulphonic acid | 1-amino-8-hydroxy-naphthalene-4,6-disulphonic acid | diethylamine |
| 11 | 1-amino-8-hydroxy-naphthalene-3,6-disulphonic acid | 1-amino-8-hydroxy-naphthalene-3,6-disulphonic acid | taurine |
| 12 | 1-amino-8-hydroxy-naphthalene-3,6-disulphonic acid | 1-amino-8-hydroxy-naphthalene-3,6-disulphonic acid | ethanolamine |
| 13 | 1-amino-8-hydroxy-naphthalene-3,6-disulphonic acid | 1-amino-8-hydroxy-naphthalene-3,6-disulphonic acid | diethylamine |
| 14 | 1-amino-8-hydroxy-naphthalene-3,6-disulphonic acid | 1-amino-8-hydroxy-naphthalene-3,6-disulphonic acid | aminoacetic acid |
| 15 | 1-amino-8-hydroxy-naphthalene-3,6-disulphonic acid | 1-amino-8-hydroxy-naphthalene-3,6-disulphonic acid | β-aminopropionic acid |
| 16 | 1-amino-8-hydroxy-naphthalene-4,6-disulphonic acid | 1-amino-8-hydroxy-naphthalene-4,6-disulphonic acid | taurine |
| 17 | 1-amino-8-hydroxy-naphthalene-4,6-disulphonic acid | 1-amino-8-hydroxy-naphthalene-4,6-disulphonic acid | N-methyltaurine |
| 18 | 1-amino-8-hydroxy-naphthalene-4,6-disulphonic acid | 1-amino-8-hydroxy-naphthalene-4,6-disulphonic acid | β-methoxyethylamine |
| 19 | 1-amino-8-hydroxy-naphthalene-4,6-disulphonic acid | 1-amino-8-hydroxy-naphthalene-4,6-disulphonic acid | methylaminomethyl-sulphonic acid |
| 20 | 1-amino-8-hydroxy-naphthalene-4,6-disulphonic acid | 1-amino-8-hydroxy-naphthalene-4,6-disulphonic acid | aminoacetic acid |
| 21 | 1-amino-8-hydroxy-naphthalene-3,6-disulphonic acid | 2-amino-5-hydroxy-naphthalene-7-sulphonic acid | N-methylmamine |
| 22 | 1-amino-8-hydroxy-naphthalene-3,6-disulphonic acid | 2-amino-5-hydroxy-naphthalene-7-sulphonic acid | taurine |
| 23 | 1-amino-8-hydroxy-naphthalene-3,6-disulphonic acid | 2-amino-5-hydroxy-naphthalene-7-sulphonic acid | aminol sulphate |
| 24 | 2-amino-5-hydroxy-naphthalene-7-sulphonic acid | 2-amino-5-hydroxy-naphthalene-7-sulphonic acid | N-methyltaurine |
| 25 | 2-amino-8-hydroxy-naphthalene-3,6-disulphonic acid | 2-amino-8-hydroxy-naphthalene-3,6-disulphonic acid | " |
| 26 | 2-amino-8-hydroxy-naphthalene-3,6-disulphonic acid | 2-amino-8-hydroxy-naphthalene-3,6-disulphonic acid | morpholine |
| 27 | 2-amino-8-hydroxy-naphthalene-3,6-disulphonic acid | 2-amino-8-hydroxy-naphthalene-3,6-disulphonic acid | taurine |
| 28 | 2-amino-5-hydroxy-naphthalene-1,7-disulphonic acid | 2-amino-5-hydroxy-naphthalene-1,7-disulphonic acid | morpholine |
| 29 | 2-amino-5-hydroxy-naphthalene-1,7-disulphonic acid | 2-amino-5-hydroxy-naphthalene-1,7-disulphonic acid | N-methyltaurine |
| 30 | 2-amino-8-hydroxy-naphthalene-8-sulphonic acid | 2-amino-8-hydroxy-naphthalene-8-sulphonic acid | " |
| 31 | 1-amino-8-hydroxy-naphthalene-3,6-disulphonic acid | 1-(4'-amino-2'-sulphophenyl)-pyrazol-5-one-3-carboxylic acid | morpholine |
| 32 | 1-amino-8-hydroxy-naphthalene-3,6-di- | 1-(4'-amino-2'-sulphophenyl)- | N-methyltaurine |

-continued

| Example | Coupling component | Coupling component | Amine |
|---|---|---|---|
|  | sulphonic acid | pyrazol-5-one-3-carboxylic acid |  |
| 33 | 1-amino-8-hydroxy-naphthalene-3,6-di-sulphonic acid | 1-acetoacetylamino-4-amino-2-methoxy-benzene-5-sulphonic acid | morpholine |
| 34 | 1-amino-8-hydroxy-naphthalene-3,6-di-sulphonic acid | 1-acetoacetylamino-4-amino-2-methoxy-benzene-5-sulphonic acid | taurine |
| 35 | 1-amino-8-hydroxy-naphthalene-3,6-di-sulphonic acid | 1-acetoacetylamino-4-aminobenzene-5-sulphonic acid | taurine |
| 36 | 1-amino-8-hydroxy-naphthalene-3,6-di-sulphonic acid | 1-acetoacetylamino-4-aminobenzene-5-sulphonic acid | N-methyltaurine |

EXAMPLE 37

0.1 mol of 1-amino-5-(5'-chloro-6'-fluoro-pyrimidin-4'-ylamino)-benzene-2-sulphonic acid is suspended in 500 ml of ice water, and the resulting suspension is acidified with 28 ml of 30% strength hydrochloric acid. 70 ml of 10% strength sodium nitrite solution are added dropwise to this suspension over a period of half an hour, and the resulting mixture is then stirred for approximately another hour. The small excess of nitrite is destroyed with sulphamic acid. The diazotization solution is then introduced into an initial charge of 0.05 mol of the binary coupling component from Example 1 and 28 g of sodium bicarbonate in 500 ml of water over a period of half an hour. The mixture is stirred at 10 to 15° until coupling is complete. The dyestuff is precipitated from the clear solution by addition of 15% by volume of potassium chloride. Suction filtration, drying and milling give a red dyestuff powder which is readily soluble in water to give a red solution.

The dyestuff dyes cotton in a clear neutral red (colour indicator number 8) by one of the methods customary for cotton reactive dyestuffs. In the form of the free acid, the dyestuff has the formula

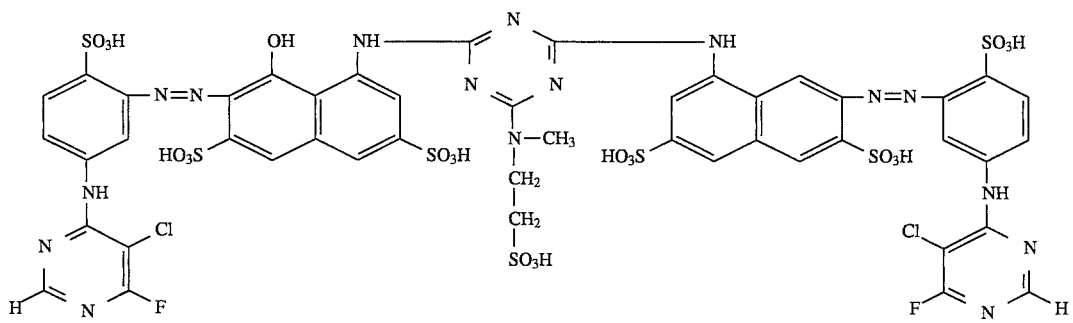

Further valuable dyestuffs which dye cotton in the hue listed in the fourth column of the table below are obtained by repeating the procedure of this example and combining the diazo components listed in the second column of the table below with the coupling components mentioned in the third column and known from Examples 1 to 36.

| Example | Diazo component | Coupling component | Hue | Colour indicator number |
|---|---|---|---|---|
| 38 | 1-amino-5-(5'-chloro-6'-fluoro-pyrimidin-4'-ylamino)-benzene-2-sulphonic acid | 2 | red | 8 |
| 39 | 1-amino-5-(5'-chloro-6'-fluoro-pyrimidin-4'-ylamino)-benzene-2-sulphonic acid | 3 | yellowish red | 7 |
| 40 | 1-amino-5-(5'-chloro-6'-fluoro-pyrimidin-4'-ylamino)-benzene-2-sulphonic acid | 4 | " | 7 |
| 41 | 1-amino-5-(5'-chloro-6'-fluoro-pyrimidin-4'-ylamino)-benzene-2-sulphonic acid | 6 | " | |
| 42 | 1-amino-5-(5'-chloro-6'-fluoro-pyrimidin-4'-ylamino)-benzene-2-sulphonic acid | 8 | " | 7 |
| 43 | 1-amino-5-(5'-chloro-6'-fluoro-pyrimidin-4'-ylamino)-benzene-2-sulphonic acid | 10 | red | 8 |
| 44 | 1-amino-5-(5'-chloro-6'-fluoro-pyrimidin-4'-ylamino)-benzene-2-sulphonic acid | 11 | " | 8 |
| 45 | 1-amino-5-(5'-chloro-6'-fluoro-pyrimidin-4'-ylamino)-benzene-2-sulphonic acid | 12 | " | 8 |
| 46 | 1-amino-5-(5'-chloro-6'-fluoro-pyrimidin-4'-ylamino)-benzene-2-sulphonic acid | 13 | " | 8 |
| 47 | 1-amino-5-(5'-chloro-6'-fluoro-pyrimidin-4'-ylamino)-benzene-2-sulphonic acid | 15 | yellowish red | 7 |
| 48 | 1-amino-5-(5'-chloro-6'-fluoro-pyrimidin-4'-ylamino)-benzene-2-sulphonic acid | 16 | " | 7 |
| 49 | 1-amino-5-(5'-chloro-6'-fluoro-pyrimidin-4'-ylamino)-benzene-2-sulphonic acid | 20 | reddish orange | 6 |
| 50 | 1-amino-5-(5'-chloro-6'-fluoro-pyrimidin-4'-ylamino)-benzene-2-sulphonic acid | 23 | yellowish orange | 4 |
| 51 | 1-amino-5-(5'-chloro-6'-fluoro-pyrimidin-4'-ylamino)-benzene-2-sulphonic acid | 27 | " | 4 |
| 52 | 1-amino-5-(5'-chloro-6'-fluoro-pyrimidin-4'-ylamino)-benzene-2-sulphonic acid | 24 | yellowish red | 7 |
| 53 | 1-amino-5-(5'-chloro-6'-fluoro-pyrimidin-4'-ylamino)-benzene-2-sulphonic acid | 4 | yellow | 2 |
| 54 | 1-amino-5-(5'-chloro-6'-fluoro-pyrimidin-4'-ylamino)-benzene-2-sulphonic acid | 5 | " | 2 |
| 55 | 1-amino-5-(5'-chloro-6'-fluoro-pyrimidin-4'-ylamino)-benzene-2-sulphonic acid | 6 | " | 2 |
| 56 | 1-amino-5-(5'-chloro-2',6'-difluoro-pyrimidin-4'-ylamino)-benzene-2-sulphonic acid | 1 | red | 8 |
| 57 | 1-amino-5-(5'-chloro- | 2 | " | 8 |

-continued

| Example | Diazo component | Coupling component | Hue | Colour indicator number |
|---|---|---|---|---|
| | 2',6'-difluoro-pyrimidin-4'-ylamino)-benzene-2-sulphonic acid | | | |
| 58 | 1-amino-5-(5'-chloro-2',6'-difluoro-pyrimidin-4'-ylamino)-benzene-2-sulphonic acid | 3 | yellowish red | 7 |
| 59 | 1-amino-5-(5'-chloro-2',6'-difluoro-pyrimidin-4'-ylamino)-benzene-2-sulphonic acid | 16 | " | 7 |
| 60 | 1-amino-4-(5'-chloro-2'-fluoro-pyrimidin-4'-yl-amino)-benzene-2-sulphonic acid | 1 | bluish red | 9 |
| 61 | 1-amino-4-(5'-chloro-2'-fluoro-pyrimidin-4'-yl-amino)-benzene-2-sulphonic acid | 2 | " | 9 |
| 62 | 1-amino-4-(5'-chloro-2'-fluoro-pyrimidin-4'-yl-amino)-benzene-2-sulphonic acid | 3 | " | 9 |
| 63 | 1-amino-4-(5'-chloro-2'-fluoro-pyrimidin-4'-yl-amino)-benzene-2-sulphonic acid | 16 | " | 9 |
| 64 | 1-amino-4-(5'-chloro-2'-fluoro-pyrimidin-4'-yl-amino)-benzene-2-sulphonic acid | 4 | yellow | 2 |
| 65 | 1-amino-4-(5'-chloro-2'-fluoro-pyrimidin-4'-yl-amino)-benzene-2-sulphonic acid | 6 | golden yellow | 3 |
| 66 | 1-amino-4-(5'-chloro-2'-fluoro-pyrimidin-4'-yl-amino)-benzene-2-sulphonic acid | 31 | brown | 25 |
| 67 | 1-amino-4-(5'-chloro-2'-fluoro-pyrimidin-4'-yl-amino)-benzene-2-sulphonic acid | 32 | " | 25 |
| 68 | 1-amino-4-(5'-chloro-2'-fluoro-pyrimidin-4'-yl-amino)-benzene-2-sulphonic acid | 33 | " | 25 |
| 69 | 1-amino-4-(5'-chloro-2',6-difluoro-pyrimidin-4'-ylamino)-benzene-2-sulphonic acid | 1 | bluish red | 9 |
| 70 | 1-amino-4-(5'-chloro-2',6-difluoro-pyrimidin-4'-ylamino)-benzene-2-sulphonic acid | 16 | " | 9 |
| 71 | 1-amino-4-(5'-chloro-2',6-difluoro-pyrimidin-4'-ylamino)-benzene-2-sulphonic acid | 4 | yellow | 2 |
| 72 | 1-amino-4-(5'-chloro-2',6-difluoro-pyrimidin-4'-ylamino)-benzene-2-sulphonic acid | 6 | golden yellow | 3 |
| 73 | 1-amino-4-(5'-chloro-2',6-difluoro-pyrimidin-4'-ylamino)-benzene-2-sulphonic acid | 31 | brown | 25 |
| 74 | 1-amino-4-(5'-chloro-2',6-difluoro-pyrimidin-4'-ylamino)-benzene-2-sulphonic acid | 33 | " | 25 |
| 75 | 1-amino-5-(2'-fluoro-pyrimidin-4'-ylamino)-benzene-2-sulphonic acid | 1 | red | 8 |
| 76 | 1-amino-5-(2'-fluoro-pyrimidin-4'-ylamino)-benzene-2-sulphonic acid | 6 | golden yellow | 3 |

| Example | Diazo component | Coupling component | Hue | Colour indicator number |
|---|---|---|---|---|
| 77 | 1-amino-5-(5'-chloro-2'-fluoro-pyrimidin-4'-yl-amino)-benzene-2,5-disulphonic acid | 2 | bluish red | 9 |
| 78 | 1-amino-5-(5'-chloro-2'-fluoro-pyrimidin-4'-yl-amino)-benzene-2,5-disulphonic acid | 4 | yellow | 2 |
| 79 | 1-amino-5-(5'-chloro-2'-fluoro-pyrimidin-4'-yl-amino)-benzene-2,5-disulphonic acid | 4 | golden yellow | 3 |

We claim:

1. A reactive dyestuff having the general formula (1)

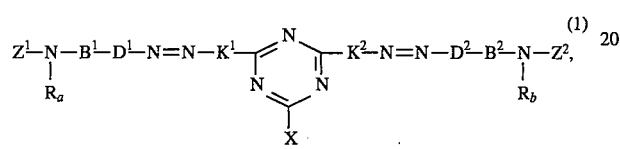

in which
  $K^1$ and $K^2$ denote coupling components which are identical or different,
  $D^1$ and $D^2$, independently of one another, represent a substituted or unsubstituted benzene or naphthalene radical,
  $R_a$ and $R_b$, independently of one another, denote hydrogen or substituted or unsubstituted $C_1$–$C_4$-alkyl,
  $B^1$ and $B^2$, independently of one another, represent a direct bond or a bridging member,
  $Z^1$ and $Z^2$, independently of one another, represent a pyrimidine reactive group containing chlorine or fluorine as the leaving group, or represent 2,3-dichloroquinoxaline- 6-carboxyl,
  X represents $SR^1$, $OR^2$, or

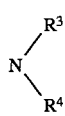

in which,
  $R^1$ denotes substituted or unsubstituted $C_1$–$C_4$-alkyl, substituted or unsubstituted phenyl, naphthyl or 2-benzthiazolyl,
  $R^2$ represents hydrogen, substituted or unsubstituted $C_1$–$C_4$-alkyl or substituted or unsubstituted phenyl or naphthyl,
  $R^3$ represents hydrogen or an aliphatic, cycloaliphatic, heterocyclic or araliphatic radical, and
  $R^4$ has the meaning of $R^3$ or represents an aromatic radical,
or in which $R^3$ and $R^4$, with the inclusion of a further hetero atom, optionally form a 5- or 6-membered ring.

2. A reactive dyestuff according to claim 1, wherein the coupling components $K^1$ and $K^2$, independently of one another, denote acetoacet arylides, pyrazolones, pyridones and aminonaphthols.

3. A reactive dyestuff according to claim 1, characterized in that the coupling components $K^1$ and $K^2$, independently of one another, have the formulae (2) to (5)

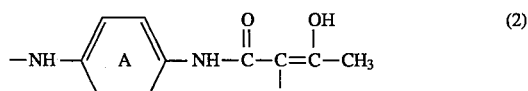

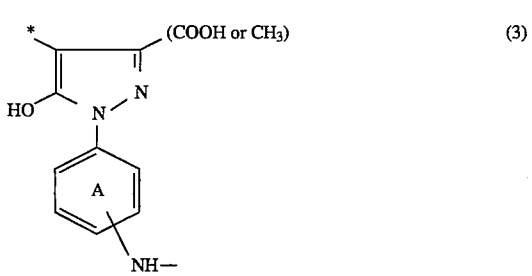

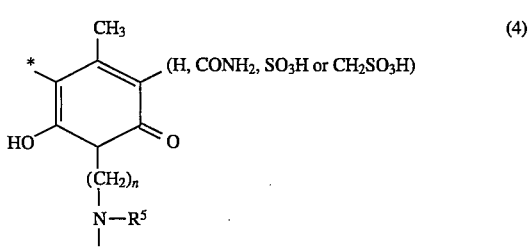

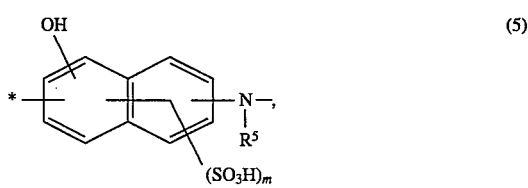

in which benzene radical A is unsubstituted or substituted by further substituents,
  n is an integer from 2 to 6,
  m is 1 or 2, and
  $R^5$ represents hydrogen, methyl or ethyl, the bivalent radicals of the formulae (2) to (5) being linked to the triazinyl radical via their amino group and to the azo group of the formula (1) via the bond marked with *.

4. A reactive dyestuff according to claim 1, wherein $B^1$ and $B^2$, independently of one another, denote a direct bond, a $C_1$–$C_4$-alkylene, arylene, arylsulphonylamino, arylcarbonylamino or an alkylenecarbonylamino bridge.

5. A reactive dyestuff according to claim 1, wherein $Z^1$ and $Z^2$, independently of one another, have the formula (6)

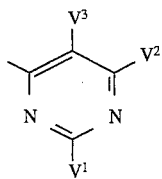 (6)

in which

V³ represents H, CH₃, F, Cl, Br, NO₂, CN, CONH₂, SO₂NH₂, CH₃SO₂, COOH, COOCH₃ or COOC₂H₅, V² and V¹, independently of one another, represent H, CH₃, F, Cl or CH₃SO₂, with the proviso that at least one of the radicals V¹ or V² denotes F or Cl.

6. A reactive dyestuff according to claim 1, wherein the radicals

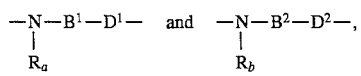

independently of one another, denote:

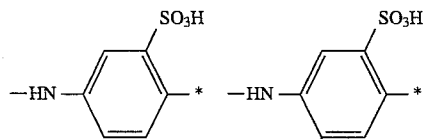

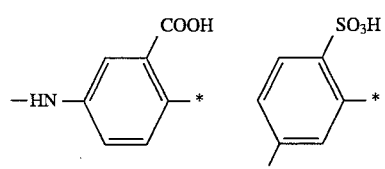

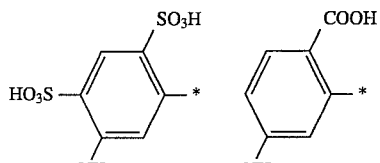

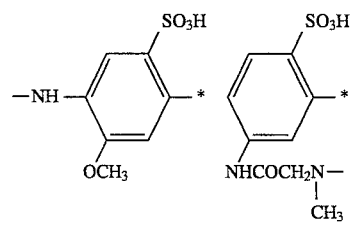

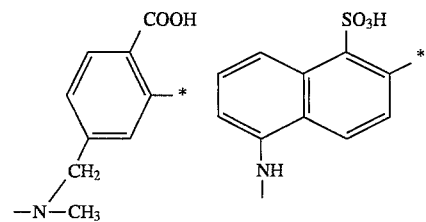

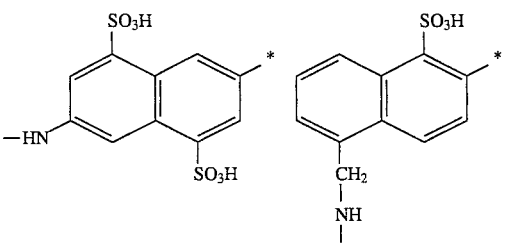

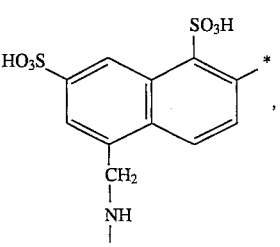

the radicals listed being linked to the azo group via the bonds marked with *.

7. A reactive dyestuff according to claim 1, wherein the radical —X represents

—NH₂, —NHCH₃, —N(CH₃)₂, —NHC₂H₅,

—N(C₂H₅)₂, —NHCH₂CH₂OH, —NHCH₂CH₂OSO₃H,

—NHCH₂CH₂SO₃H, —NHCH₂COOH,

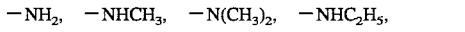

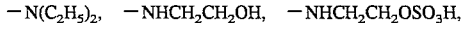

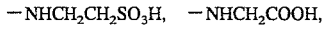

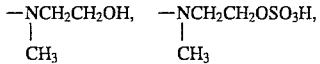

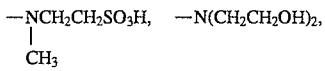

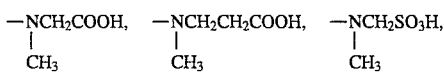

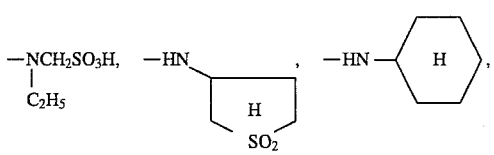

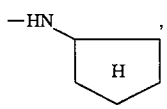

—NHCH₂CH₂CH₂SO₂CH₂CH₂OSO₃H,

—NHCH₂CH₂SO₂CH₂CH₂OSO₃H,

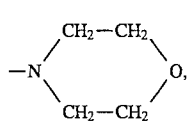

31
-continued

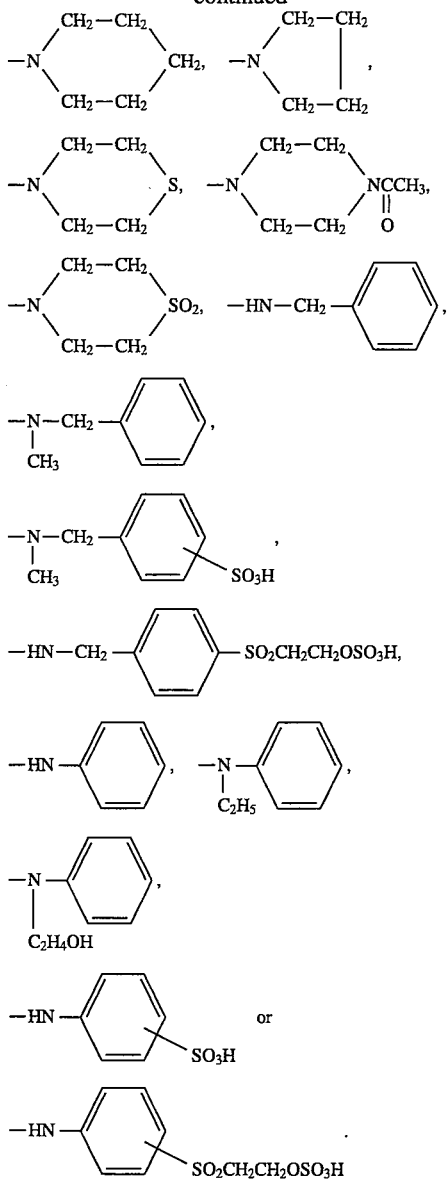

8. A reactive dyestuff according to claim 1, in which $K^1$ and $K^2$ each represent

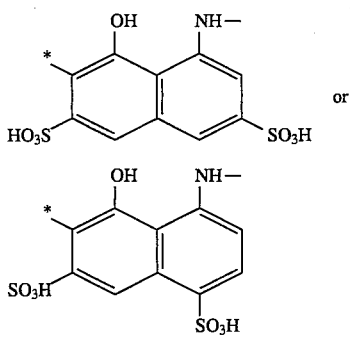

$K^1$ and $K^2$ being linked to the azo group via the bond marked with *, and

32

$$-N-B^1-D^1- \quad \text{and} \quad -N-B^2-D^2-$$
$$\phantom{-N-B^1}R_a \phantom{-D^1-} \phantom{\text{and}} \phantom{-N-B^2}R_b$$

each denote,

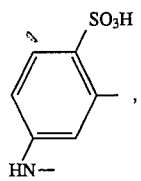

and $Z^1$ and $Z^2$, independently of one another, represent

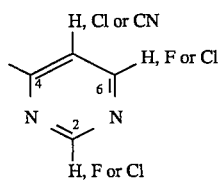

with the proviso that at least one of the substituents in the 2- or 6- position represents F or Cl, and

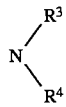

represents $NH_2$ or denotes the radical of an aliphatic amino group, preferably of an aliphatic amino group in which $R^3$ group substituted by COOH, $SO_3H$ or $OSO_3H$.

9. Process for preparing the reactive dyestuff according to claim 1, wherein a) two mol equivalents of an amine or one mol equivalent each of two different amines having the general formula (7a) and/or (7b)

 (7a)

 (7b)

in which $Z^1$, $R_a$, $B^1$ and $D^1$ and $Z^2$, $R_b$, $B^2$ and $D^2$ have the meaning given, are diazotized, and the resulting diazonium salt is reacted with one mol equivalent of a coupling component of the formula (8)

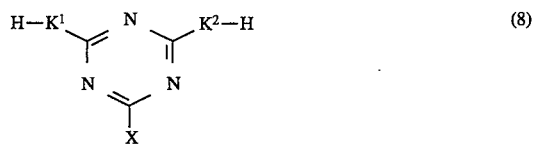 (8)

in which $K^1$, $K^2$ and X have the meaning given in claim 1, or b) one mol equivalent of an azo dyestuff of the formula

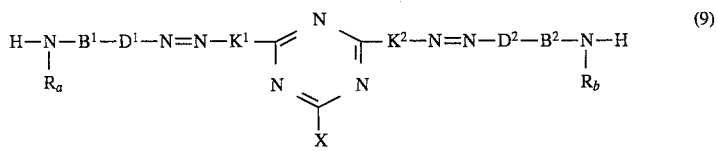
(9)

in which $R_a$, $R_b$, $B^1$, $B^2$, $D^1$, $D^2$, $K^1$, X and $K^2$ have the meaning given, is condensed with two mol equivalents of a reactive component of the formula $Z^1$—F or —Cl or $Z^2$—F or —Cl          (10)

or with one mol equivalent each of a different reactive component $Z^1$—F or —Cl and $Z^2$—F or —Cl, in which $Z^1$ and $Z^2$ have the meaning given, with the elimination of HF and/or HCl.

10. Process for dyeing hydroxyl- and amido-containing fibre material, comprising applying thereto the reactive dyestuff according to claim 1.

11. Hydroxyl- or amido-containing fibre material, which has been dyed with a reactive dyestuff according to claim 1.

* * * * *

UNITED STATES PATENT AND TRADEMARK OFFICE
CERTIFICATE OF CORRECTION

PATENT NO. : 5,569,747
DATED : October 29, 1996
INVENTOR(S) : Jager, et al.

It is certified that error appears in the above-indentified patent and that said Letters Patent is hereby corrected as shown below:

Col. 27, line 40   Before " represents " insert -- X --

Signed and Sealed this

Eleventh Day of March, 1997

Attest:

BRUCE LEHMAN

Attesting Officer         Commissioner of Patents and Trademarks